United States Patent [19]

Inaba et al.

[11] Patent Number: 5,501,615
[45] Date of Patent: Mar. 26, 1996

[54] ELECTRO-MAGNETICALLY SHIELDED CONNECTOR

[75] Inventors: Shigemitsu Inaba; Shigemi Hashizawa; Hidehiko Kuboshima, all of Shizuoka, Japan

[73] Assignee: Yazaki Corporation, Tokyo, Japan

[21] Appl. No.: 439,788

[22] Filed: May 12, 1995

Related U.S. Application Data

[62] Division of Ser. No. 249,199, May 26, 1994, Pat. No. 5,460,544.

[30] Foreign Application Priority Data

May 26, 1993 [JP] Japan .................................. 5-145407
May 26, 1993 [JP] Japan .................................. 5-145408
Aug. 31, 1993 [JP] Japan .................................. 5-216039

[51] Int. Cl.[6] ........................................... H01R 17/04
[52] U.S. Cl. ................................ 439/578; 439/610
[58] Field of Search ........................ 439/98, 578, 610

[56] References Cited

U.S. PATENT DOCUMENTS 4,721,483  1/1988  Dickie .................................. 439/610
4,963,104  10/1990 Dickie .................................. 439/610
5,417,587  5/1995  Katsuda et al. ..................... 439/610

FOREIGN PATENT DOCUMENTS 63-127083  8/1988  Japan .
4-242086   8/1992  Japan .
4-272672   9/1992  Japan .

Primary Examiner—Gary F. Paumen
Attorney, Agent, or Firm—Sughrue, Mion, Zinn, Macpeak & Seas

[57] ABSTRACT

An electro-magnetically shielded connector comprises a connector body including at least two housings; an electrically conductive layer formed on a surface of one of the two housings in such a manner that the electrically conductive layer covers a surface of the one housing, and when the two housings are combined with each other, at least a part of the electrically conductive layer on an inner surface of the one housing is exposed; and main electrically connecting device for electrically connecting the electrically conductive layer of the connector body and a shield of a shielded cable to seal an inside of the connector body.

1 Claim, 10 Drawing Sheets

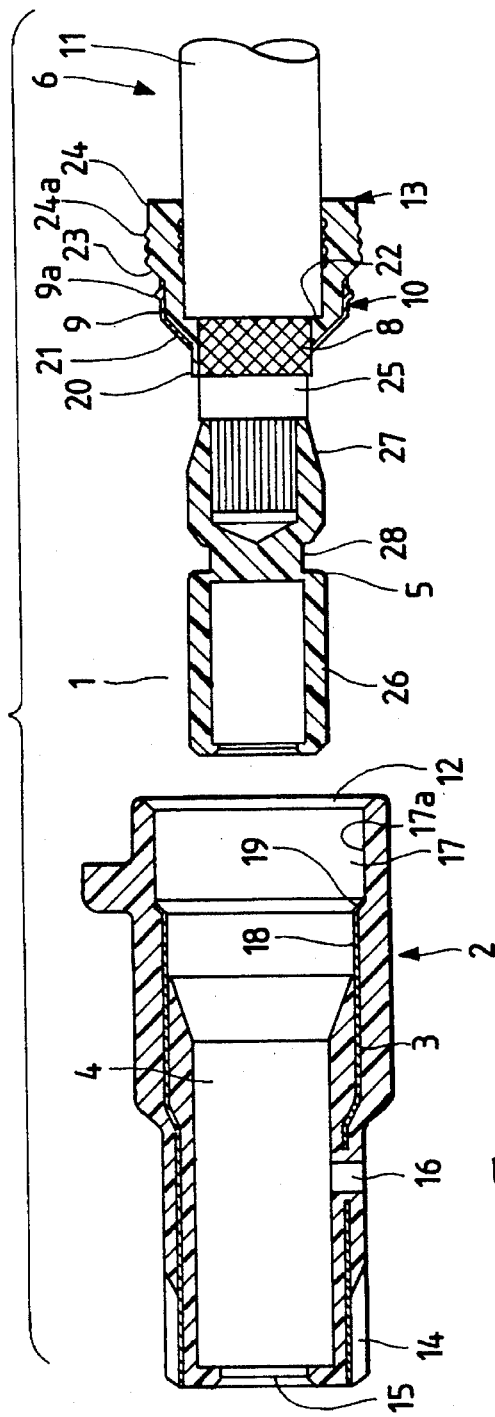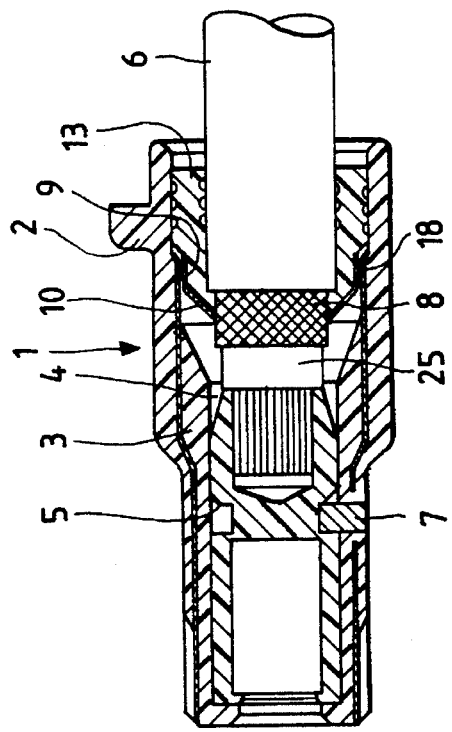

ELECTRO-MAGNETICALLY SHIELDED CONNECTOR

This is a divisional of U.S. application Ser. No. 08/249,199 filed May 26, 1994, now U.S. Pat. No. 5,460,544 issued Oct. 24, 1995.

BACKGROUND OF THE INVENTION

1. Field of the Invention

This invention relates to a shielded connector having an electro-magnetic shield function and a water-proof function.

2. Related Art

FIG. 8 shows a shielded connector which is disclosed, for instance, by Unexamined Japanese Utility Patent Application No. 127083/1988.

The shielded connector 4 comprises: a connector housing 41 of synthetic resin; a metal shield 42 formed on the inner surface of the connector housing 41; a shielded cable 46 from which sheathed wires 46 are protruded, the wires 46 being connected to press-connecting terminals 44 in the terminal receiving section 43 of the connector housing; and a crimping part 48 which is integral with the metal shield 42, being connected to the braided shield 47 of the shielded cable 46.

When the press-connecting terminals 44 connected to the sheathed wires 45 of the shielded cable 46 are engaged with the connector housing 41, noises generated by the latter 41 are magnetically shielded by the metal shield 42, and grounded through the braided shield 47 and a drain line 49 provided inside the former.

FIG. 9 shows the water-proof structure of a conventional shielded connector disclosed by Japanese Patent Application (OPI) No. 182071/1991. In order to prevent the entrance of water into the connector through the braided shields 50 of shielded wires 52, the shield connector has a rubber member 55 which is formed on it by molding in such a manner that it covers the shielded connector from the bases of the shielded wires 52 to the ends of braided wires 51.

However, the above-described water-proofing structure is disadvantageous in the following points: Since the braided wires 51 are covered with the rubber member 55, they are difficult to bend, and therefore the engagement and disengagement of the terminals 56 are rather troublesome. In addition, the formation of the rubber member 55 by molding takes a lot of time and labor.

In the above-described shielded connector 40 shown in FIG. 8, the shielded cable 46 is fixed to the metal shield 42 with the crimping part 48 which is integral with the metal shield 42. And no water-proofing means is provided for the junction between the shielded cable 46 and the connector housing 41, and therefore water may go into the connector through the junction.

In order to ground the noises generated by the connector housing 41; that is, in order to obtain a shielding function, the metal shield 42 is fitted in the connector housing 41. Hence, the shielded connector is relatively large in the number of components, and the manufacturing of the components and the assembling of them take a lot of time and labor.

SUMMARY OF THE INVENTION

In view of the foregoing, an object of this invention is to provide an electro-magnetically shielded connector in which, at the junction between an connector housing and a shielded cable, is satisfactory in electrical conduction and has a sufficiently high shielding function, and which is positively water-proofed, and in which the number of components is smaller than in the prior art, and the components can be manufactured and assembled more readily. The invention has been developed to eliminate the above-described difficulties and problems. That is, another object of the invention is to provide an electro-magnetically shielded connector which is light and small, and which is low in manufacturing cost, and which is sufficiently water-proofed and dust-proofed.

The invention is to eliminate the above-described difficulties and problems. That is, another object of the invention is to provide an electro-magnetically shield connector which is simple in the control of manufacturing tolerances, thus being high in yield, and which is low in manufacturing cost, and is sufficiently water-proofed and dust-proofed.

An aspect of the present invention is to provide a shielded connector comprising:

a metal shield is formed in a connector housing of synthetic resin by molding, a water-proof plug is mounted on a shielded cable connected an electrical terminal unit, which is inserted into the connector housing, in such a manner that the water-proof plug is in close contact with the shield of a shielded cable connected, and the water-proof plug is provided with electrically conducting means with respect to the metal shield.

Another aspect of the present invention is to provide an electro-magnetically shielded connector comprising:

a connector body into which a shielded cable is inserted through the rear end opening, the connector body comprises at least two housings, an electrically conductive layer which is relatively thin is formed on the surface of one of the two housings in such a manner that the electrically conductive layer covers the outer surface of the one housing and a part of the inner surface of the one housing, and, when the two housings are combined with each other, at least a part of the electrically conductive layer on the inner surface of the one housing is exposed, and the inside of the connector body is sealed with an electrically conductive elastic member in such a manner that the shield of the shielded cable and the electrically conductive layer exposed inside the connector body are electrically connected to each other being pressed by the electrically conductive elastic member.

Another aspect of the present invention is to provide an electro-magnetically shielded connector comprising: a female connector including a first shielding electrical conductor a portion of which is exposed in at least a part of the outer surface of the female connector; and a male connector including a second shielding electrical conductor a portion of which is exposed in at least a part of the inner surface of the male connector, the first and second shielding electrical conductors thus exposed being electrically connected to each other, the diameter of the portion of the second shielding electrical conductor is larger than the diameter of the portion of the first shielding electrical conductor, and an electrically conductive elastic member is interposed between the exposed portions of the first and second shielding electrical conductors, thus electrically connecting the first and second electrical conductors to each other through the exposed portions.

In the shielded connector, the metal shield is formed in the connector housing of synthetic resin by molding, and the electrically conducting means is provided for the waterproof plug mounted on the shielded cable, so that the water-proof plug is closely engaged with the metal shield. Hence, by inserting the terminal unit connected to the shielded cable into the connector housing, the metal shield of the connector housing and the braided shield of the shielded cable are electrically connected through the waterproof plug to each other, thus providing a shielding function, and at the same time, the shielded connector is waterproofed.

In the electro-magnetically shielded connector, the electrically conductive layer which is relatively thin is formed on the surface of one of the two housings in such a manner that the electrically conductive layer covers the outer surface and a part of the inner surface of the one housing, and, when the two housings are combined with each other, at least a part of the electrically conductive layer on the inner surface of the one housing is exposed. And when the shielded cable is inserted into the connector body through the rear end opening and the inside of the connector body is sealed with the electrically conductive elastic member, the shield of the shielded cable and the electrically conductive layer exposed inside the connector body are electrically connected to each other being pressed by the electrically conductive elastic member, thus forming a shielding wall which is relatively light. At the same time, the shielded connector is waterproofed with the electrically conductive elastic member sealingly engaged with it.

The diameter of the exposed portion of the shielding electrical conductor of the male connector is larger than that of the exposed portion of the shielding electrical conductor of the female connector. Hence, when the male connector is engaged with the female connector, a gap is formed between the exposed portions of the shielding conductors of the male and female connectors. The gap is filled with the electrically conductive elastic member, so that the exposed portions of the shielding electrical conductors are electrically connected through the electrically conductive elastic member to each other, thus forming a shielding wall. The electrically conductive elastic member is adjustable in volume. Hence, even if the gap is variable in dimension, it can be sufficiently filled with the electrically conductive elastic member. Furthermore, the electrically conductive elastic member, being held compressed in the gap, prevents the entrance of water into the shielded connector.

BRIEF DESCRIPTION OF THE DRAWINGS)

FIG. 1 is an exploded sectional view showing a shielded connector, which constitutes a first embodiment of this invention;

FIG. 2 is a longitudinal sectional view showing the shielded connector which is obtained by combining a connector housing with a terminal unit bearing a shielded cable;

DETAILED DESCRIPTION OF THE PREFERRED EMBODIMENTS

First Embodiment

Figure 3:
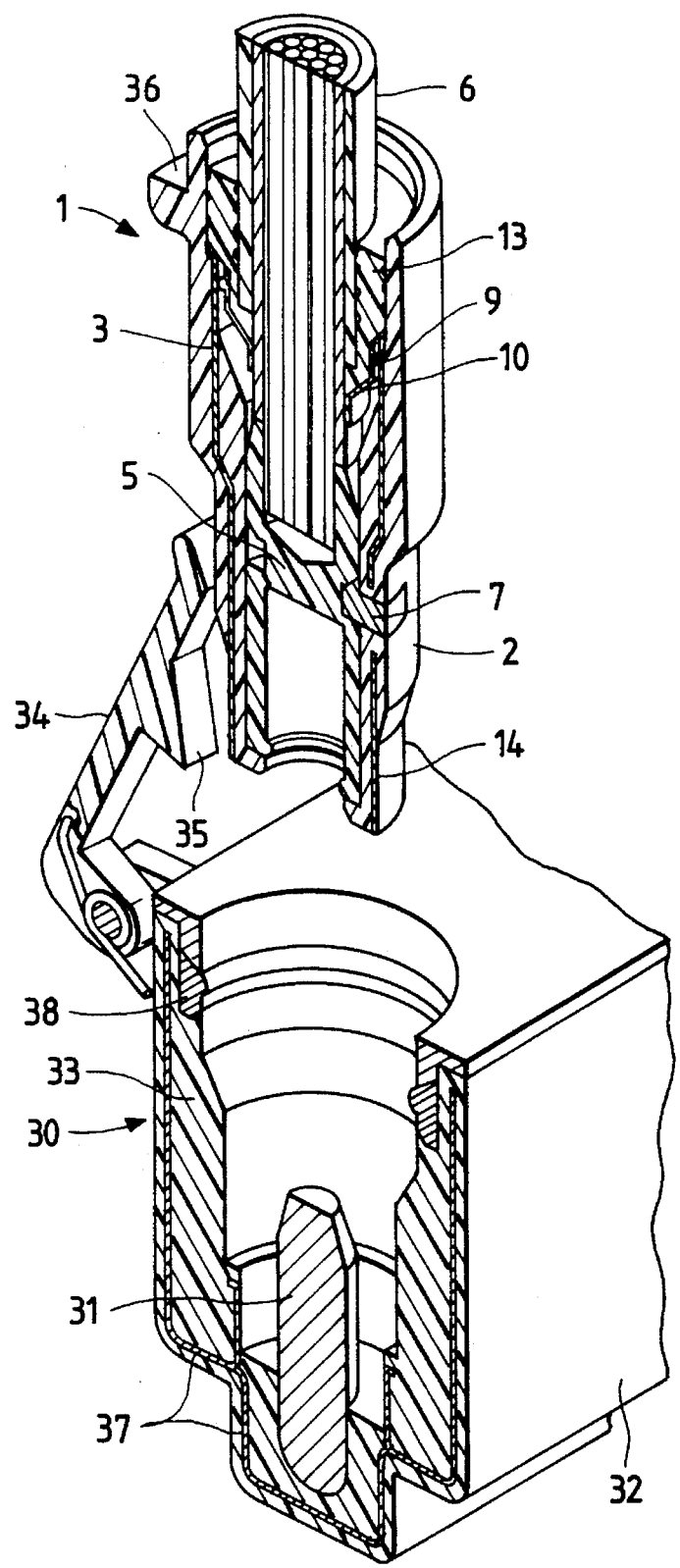
FIG. 3 is an exploded perspective view showing the shielded connector which is to be engaged with a mating connector.

A first embodiment of this invention will be described with reference to FIGS. 1 through 4.

As shown in those figures, a shielded connector 1, which constitutes the first embodiment of the invention, includes: a connector housing 2 which is substantially cylindrical and made of synthetic resin; a metal shield 3 which is substantially cylindrical and formed inside the connector housing 2 by molding in such a manner that it is integral with the latter 2; a shielded cable 6 connected to an electrical terminal 5 which is inserted into an receiving chamber circular in section which is defined by the connector housing 2; a locking member of synthetic resin which is engaged with the electrical terminal 5; a connecting member 10 which is annular and made of electrically Conductive metal; and a water-proof plug 13 which is substantially tubular and elastic. The connecting member 10 has one end portion which is press-connected onto the braided shield 8 of the shielded cable 6, and the other end portion including a contact portion 9 which is brought into contact with the inner surface of the rear of the metal shield 3. The water-proof plug 13 is fixedly mounted on the shielded cable 6 in such a manner as to cover the latter from the exposed braided shield 8 till the sheath 11. The water-proof plug 13 is adapted to close the rear opening 12 of the receiving chamber 4. The plug 13 is held pushed against the inner surface of the contact portion 9 of the connecting member 10 by caulking.

The front end portion of the connector housing 2 is formed into a cylindrical portion 14 relatively small in diameter. The cylindrical portion 14 has an inserting hole 15 into which the mating terminal of the aforementioned electrical terminal 5 is inserted. A locking-member inserting hole 16 is formed in the cylinder at the middle in such a manner that it is communicated with the receiving chamber 4. The receiving chamber 4 is opened in the rear end portion of the connector housing 2; that is, the connector housing 2 has a hollow engaging portion 17 at the rear end which is larger in diameter than the receiving chamber 4.

The hollow engaging portion 17 has a receiving step 17a, which is used as follows: When the electrical terminal 5 connected to the shielded cable 6 is inserted into the receiving chamber 4 of the connector housing 2, the step 17a allows the water-proof plug 13 to be closely fitted therein, so that the junction of the connector housing and the electrical terminal is water-proofed and the further insertion of the electrical terminal 5 is prevented.

The metal shield 3 is buried in the connector housing 2 in conformance to the configuration of the latter 2. More specifically, the metal shield is extended from the front end of the cylindrical portion 14 towards the hollow engaging portion 17. The rear end portion of the metal shield 3 is positioned before the hollow engaging portion 17: that is, a contact portion 18 which is provided on the inner surface of the receiving chamber 4 in correspondence to the contact portion 9 of the connecting member 10, is annularly exposed before the hollow engaging portion 17.

The contact portion 18 has a tapered portion 19 at the rear end which is larger in diameter towards the hollow engaging portion 17. With the tapered portion 19, the connecting member 10 can be smoothly guided and moved.

The connecting member 10 comprises: an annular press-contacting portion 20 which is relatively small in diameter and is mounted on the braided shield 8 of the shielded cable 6; a sloped (tapered) portion 21 which is extended backwardly from the press-contacting portion 20 in such a manner that its diameter is larger towards the rear end; and the aforementioned annular contact portion 9 which is extended backwardly from the sloped portion 21.

The water-proof plug 13 is pressed against the inner surface of the contact porion 9, so that the latter 9 is urged outwardly at all times; that is, it is strongly pushed against the contact portion 18 of the metal shield 3.

In the water-proof plug 13, the inner cylindrical surface has a step 22, and the outer cylindrical surface also has a step 23 which is tapered. The water-proof plug 13 is mounted on the shielded cable 6 with the inner step 22 abutted against the end of the sheath 11 of the shielded cable 6 and with the outer step 23 abutted against the end of the contact portion 9 of the connecting member 10.

The water-proof plug 13 includes a large-diameter portion 24 which has a lip 24a on its outer cylindrical surface. The large-diameter portion 14 is brought into close contact with the hollow engaging portion 17 of the accommodating chamber 4, to prevent the entrance of water into the connector housing 2.

The close contact of the water-proof plug 13 is achieved by inserting the terminal unit 5 connected to the shielded cable 6 into the receiving chamber 4. In this operation, the contact portion 9 of the connecting member 10 is brought into slide contact with the contact portion 18 of the metal shield 3, so that the braided shield 8 is connected through the connecting member 10 to the metal shield.

The electrical terminal 5 is pulled out of the connector housing as follows: That is, first the locking member 7 is removed from the locking member inserting hole 16 of the connector housing 2, and then the shielded cable 6 is pulled out. Even if, in this case, the sheathed wire 25 connected to the electrical terminal 5 is short, it will not affect the operation, because the connecting member 10 is separated from the contact porion 18 of the metal shield 3. The above description is applicable to the case where a plurality of sheathed wires (25) are protruded from the shielded cable 6.

The electrical terminal 5 comprises a pin connecting portion 26 and a wire connecting portion 27, and an annular recess 28 between them. The locking member 7 is engaged with the annular recess 28 of the electrical terminal 5, so that the latter 5 is prevented from coming off the connector housing 2.

Figure 4:
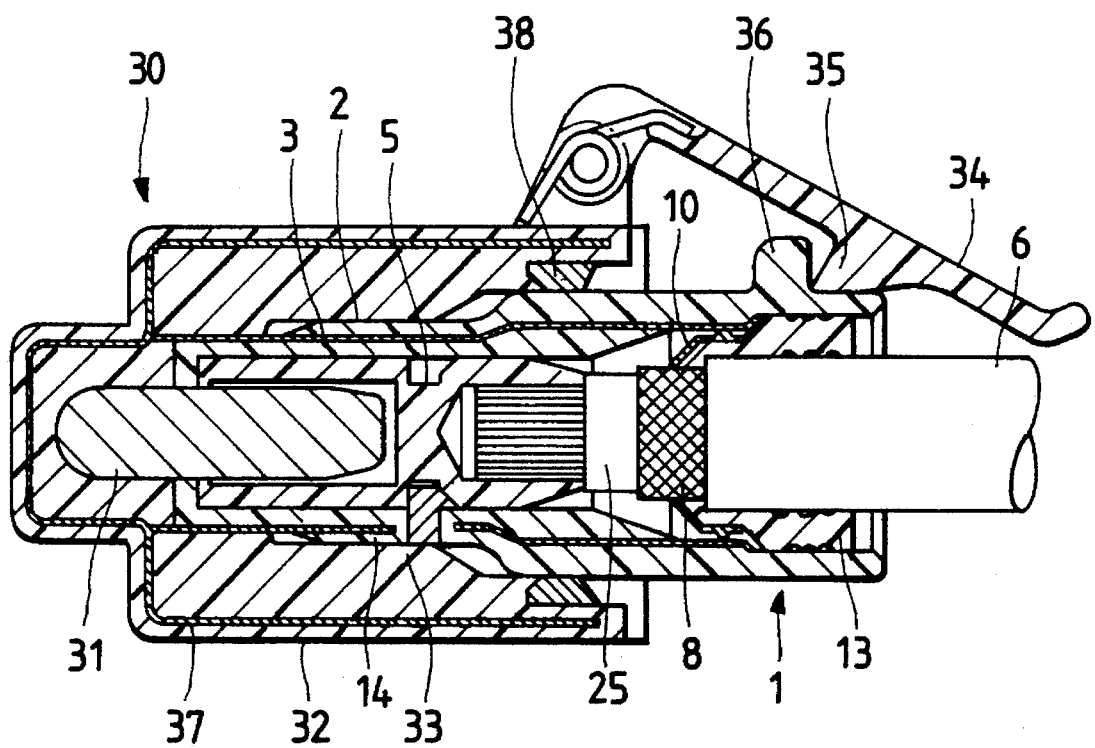
FIG. 4 is a longitudinal sectional view showing the shielded connector which has been engaged with the mating connector.

When, as shown in FIGS. 3 and 4, the shielded connector 1 is engaged with a mating connector 30, the terminal unit 5 is connected with a pin terminal 31. The connector 30 has a housing 32 including an engaging portion 33. In the connector 30, the pin terminal 31 inserted into the cylindrical portion 14 of the connector housing 2 is protruded in the engaging portion 33 of the housing 32. After the electrical terminal 5 is connected with the pin terminal 31, the pawl 35 of a rocking arm 34 is locked to an engaging protrusion 36 formed on the shielded connector 1. A metal shield 37 is buried in the housing 32 by molding. An annular packing 38 is set in the engaging portion 33, which is engaged with the cylindrical portion 14 of the connector housing 2 when the shielded connector 1 is engaged with the mating connector 30, so that, after the connection of those connectors, the entrance of water thereinto is prevented.

Second Embodiment

Figure 6:
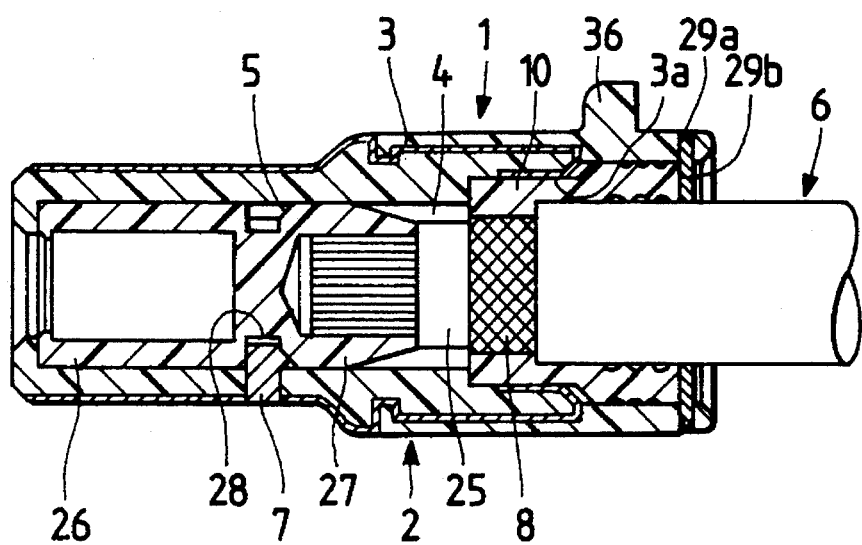
FIG. 6 is a longitudinal sectional view of the shielded connector shown in FIG. 5.
Figure 5:
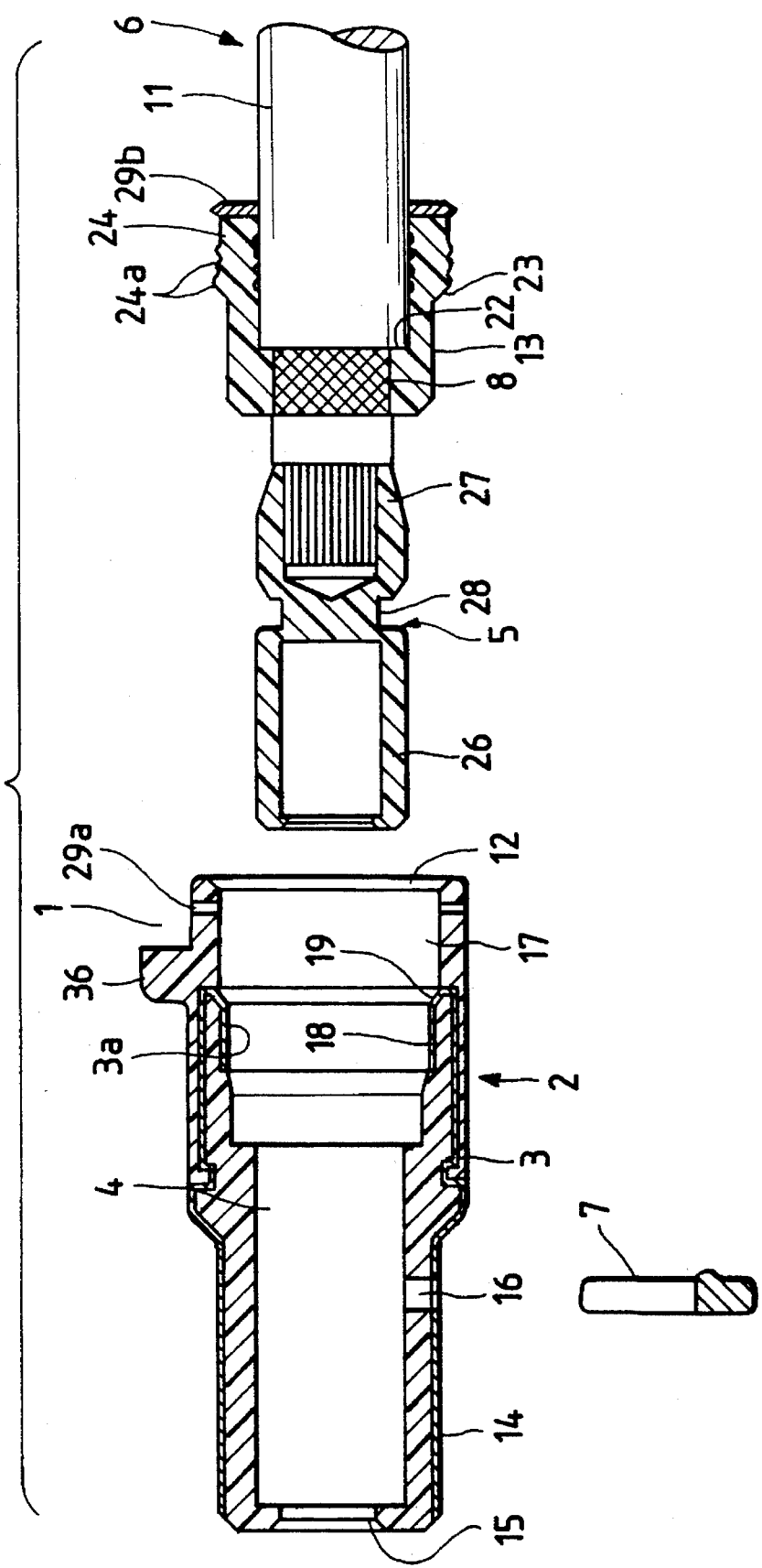
FIG. 5 is an exploded sectional view showing a shielded connector, which constitutes a second embodiment of the invention.
Figure 7:
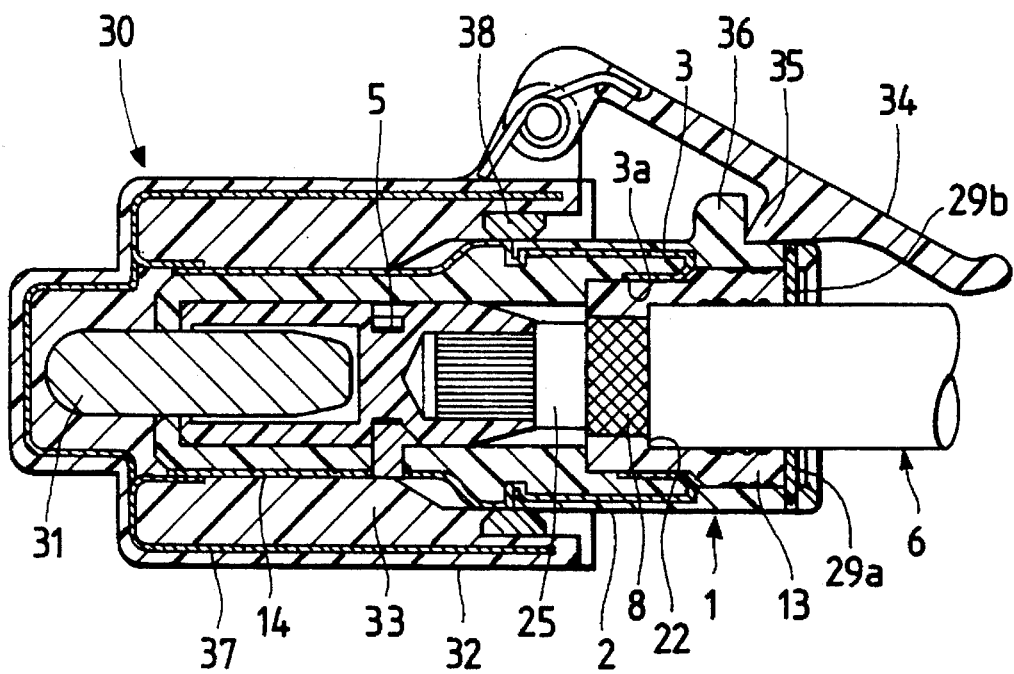
FIG. 7 is a longitudinal sectional view showing the shielded connector shown in FIG. 5 which has been engaged with a mating connector.
Figure 8:
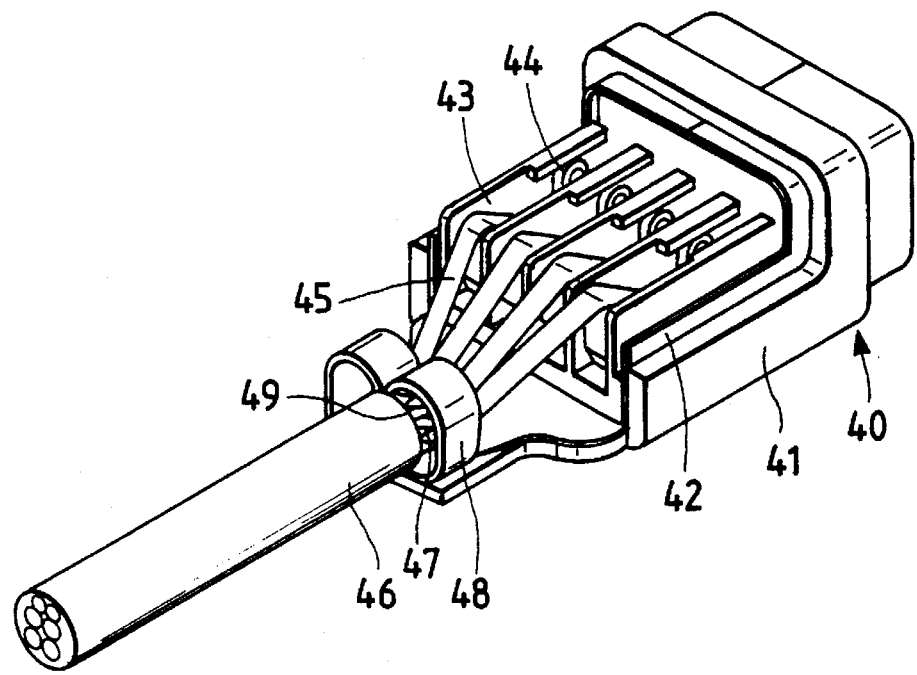
FIG. 8 is a perspective view of a conventional shielded connector.
Figure 9:
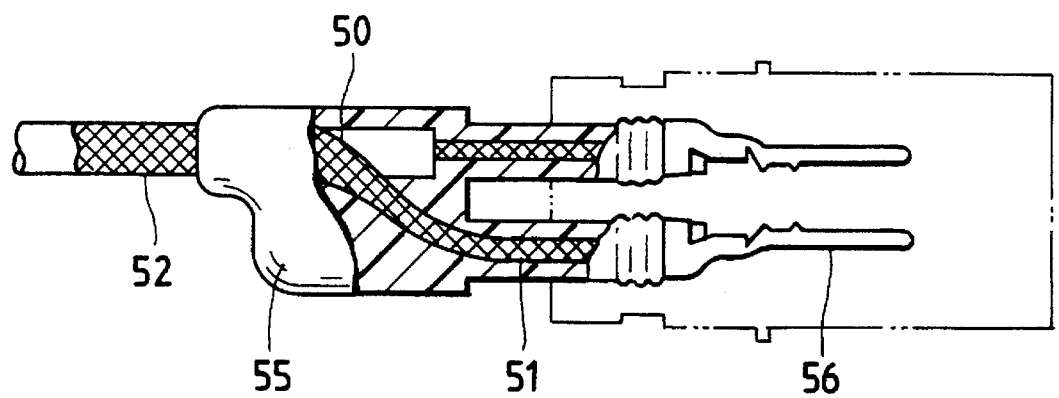
FIG. 9 is a front view, with parts cut away, showing the conventional shielded connector.

FIGS. 5 through 7 show a second embodiment of the invention.

In the above-described first embodiment, the connecting member 10 of metal, which is brought into close contact with the braided shield 8 of the shielded cable 6, is fitted on the water-proof plug 13 mounted on the shielded cable 6. Therefore, in the first embodiment, the shielding effect is obtained as follows: With the connecting member 10 electrically connected to the braided shield 8, the electrical terminal 5 connected to the shielded cable 6 is inserted into the connector housing 2 through the opening 12 until the connecting member 10 is electrically connected to the metal shield 3. At the same time, the entrance of water through the shielded cable 6 is prevented by the water-proof plug 13 which is elastic. Furthermore, the contact portion 9 of the connecting member 10 is kept pressed against the metal shield 3, being urged by the elastic force of the water-proof plug 13.

On the other hand, in the second embodiment, a water-proof plug 13 made of electrically conductive rubber is mounted on the shielded cable 6 in such a manner that, it covers the latter 6 from the braided shield 8 to the sheath 11. Furthermore, in the second embodiment, unlike the first embodiment, the connecting member 10 of metal is not employed, and instead, the rear end portion of a metal shield 3 buried in the connector housing 3 by molding is folded and exposed in the receiving chamber 4; that is, a folded portion 3a is formed which is brought into close contact with the water-proof plug 13 when the electrical terminal unit 5 is engaged with the connector housing 2. That is, in the second embodiment, the metal shield 3 of the connector housing 2 is electrically connected through the water-proof plug 13 to the braided shield 8 of the shielded cable 6, to form a shielding wall.

Hence, in the second embodiment, the number of components is reduced, and the components can be manufactured and assembled with ease. In addition, the second embodiment has the same effects and functions as the first embodiment.

As was described above, in the first and second embodiments of the invention, when the shielded cable is connected to the connector housing, the water-proof plug having the electrically conducting- means is closely fitted in the hollow engaging portion of the connector housing in which the metal shield is buried by molding. Hence, the shielded connector is satisfactory in electrical conduction at the junction between an connector housing and a shielded cable, thus having a sufficiently high shielding function, and is positively water-proofed. Furthermore, the number of components is smaller than in the prior art, and the components can be manufactured and assembled more readily.

However, the first and second embodiments of the invention are limited by in the following points: A metal mold for burying the metal shield in the connector housing is expensive. The metal shield itself is relatively heavy. Hence, it is difficult to reduce the weight of the shielded connector.

In addition, it is rather difficult to miniaturize the shielded connector.

In order to eliminate the above-described difficulties accompanying the first and second -embodiments, a third embodiment of the invention has been developed.

Third Embodiment

The third embodiment will be described with reference to FIGS. 10 and 11.

Figure 10:
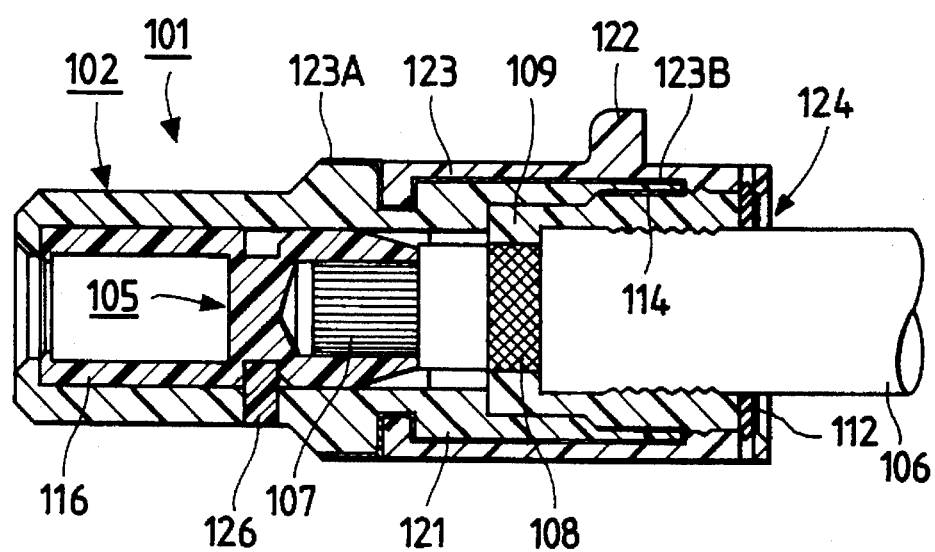
FIG. 10 is a longitudinal sectional view showing an electro-magnetically shielded connector, which constitutes a third embodiment of the invention.

FIG. 10 is a sectional view showing an electromagnetically shielded connector, which constitutes the third embodiment of the invention.

Figure 11A:
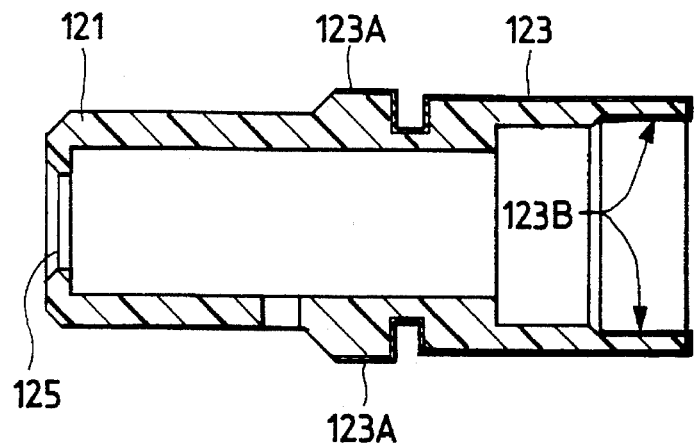
FIG. 11(a) is a longitudinal sectional view of an inner housing which forms the shielded connector shown in FIG. 10.
Figure 11B:
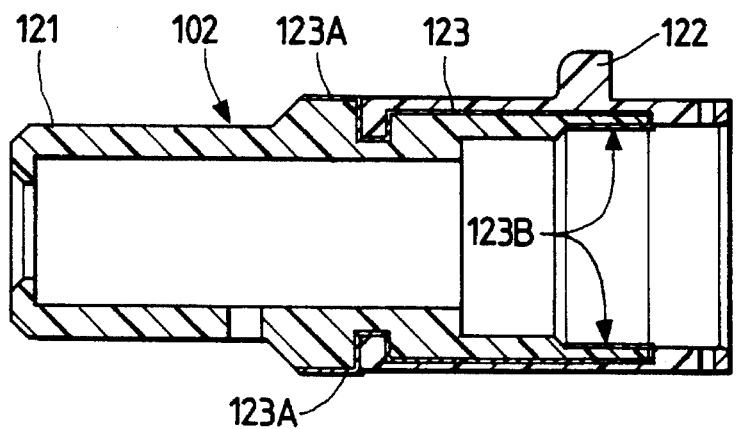
FIG. 11(b) is a longitudinal sectional view of a connector body which comprises the inner housing and an outer housing engaged with the former.
Figure 11C:
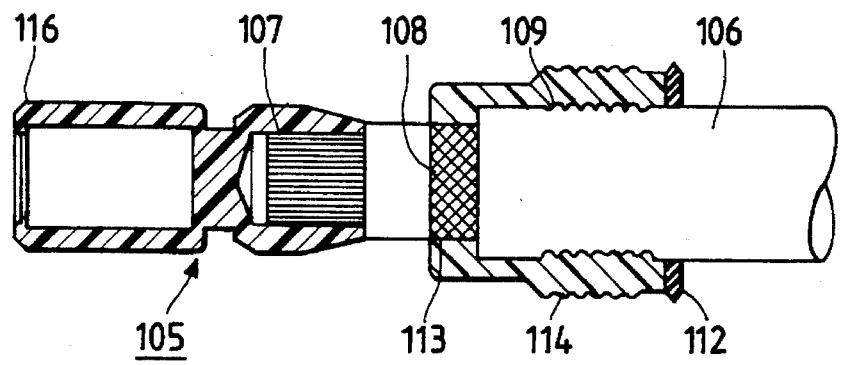
FIG. 11(c) is also a longitudinal sectional view showing a terminal unit which is engaged with the connector body.

FIGS. 11(a) to (c) are sectional views showing components of the shielded connector.

As shown in FIG. 10, the shielded connector 101 comprises: a connector body 102; and a terminal unit 105 fitted in the connector body 102.

The structure and the assembling of the connector body will be described with reference to FIGS. 11(a) and (b). The connector body 102 comprises an inner housing 121 of resin, and an outer housing 122 of resin. The outer surface of the inner housing 121 is partially covered with a thin conductive layer 123.

More specifically, the inner housing 121 is substantially in the form of a hollow cylinder which is made of insulating synthetic resin or the like. The inner housing 121 is opened wide at the rear end; that is, the rear end portion of the inner housing is larger in inside diameter than the other portion. A locking hole 125 is formed in the inner housing 121 slightly before the middle.

The thin conductive layer 123 is spread over the outer surface of the inner housing 121 substantially from the middle towards the rear end. The conductive layer 123 thus spread is folded at the rear end of the inner housing 121 and extended over the rear end portion of the inner surface. That is, the same conductive layer 123 is laid over the substantially half of the outer surface and the rear end portion of the inner surface.

In other words, the inner and outer surfaces of the inner housing 121 are selectively covered with the conductive layer 123.

The thin conductive layer 123 is formed on the predetermined portions of the inner and outer surfaces of the inner housing 121 by a variety of plating methods such as an electroless plating method, or other methods of impregnating and vacuum-depositing electrically conductive material, and applying electrically conductive paint.

The outer housing 122 is formed on the inner housing 121 in such a manner that the front end portion 123A of the conductive layer 123 on the outer surface of the inner housing 121 is exposed (hereinafter referred to as "an exposed portion 123A", when applicable), and the conductive layer 123 on the inner surface of the inner housing 121 is exposed as indicated at 123B (hereinafter referred to as "an exposed portion 123B", when applicable) (the remaining portions being covered by the outer housing 122). Thus, the connector body 102 has been formed.

Now, the structure of the terminal unit 5 will be described with reference to the part (c) of FIG. 11.

The terminal unit 5 comprises: a terminal 116 bearing the conductor 7 of a shielded cable 106; and an electrically conductive rubber plug 109. The conductive rubber plug 109 has a contact portion 113 which is brought into contact with the braided shield 108 of the shielded cable 106. The conductive rubber plug 109 is mounted on the shielded cable 116 in such a manner as to cover the latter 116.

The conductive rubber plug 109 has a contact portion 114 on the outer surface of its rear half. The contact portion 114 is electrically connected to the braided shield 108.

The engagement of the electrical terminal 5 to the connector body 102 will be described with reference to FIG. 10.

The terminal unit 105 is inserted into the connector body 102 through the rear end opening 124 until the terminal 116 abuts against the front annular bottom of the inner housing 121. Under this condition, a stopper 126 is inserted into the locking hole 125 of the connector body 102, to position the electrical terminal 5 in place. In this operation, the electrically conductive rubber plug 126 is sufficiently pushed in the forward direction so that it seals the connector body around the rear end opening, thus isolating the inside of the connector body 102 from the outside; that is, preventing the entrance of water and dust into the connector body. In addition, an outer plug 112 such as a rubber bushing may be employed as shown in FIG. 10.

The contact portion 114 of the conductive rubber plug 109 pushes the exposed portion 123B of the conductive layer 123 strongly, so that the contact portion 114 is electrically connected to the exposed portion 123B. As a result, a shielding wall is formed which is extended from the braided shield 108 through the electrically conductive rubber plug 109 to the exposed portion 123A of the conductive layer 123.

As was described above, in the electro-magnetically shielded connector of the third embodiment of the present invention, the conductive layer 123, unlike the metal shield formed by blanking a metal plate, is in the form of a thin film. Hence, the shielded connector is lighter and smaller. Furthermore, the shield of the shielded cable can be connected without the use of a connecting member such as the one in the shielded connector. Therefore, the shielded connector of the invention is smaller in the number of components, which reduces the manufacturing cost as much.

The shielded connector is tightly sealed with the electrically conductive rubber plug and the bushing; that is, it is sufficiently water-proofed and dust-proofed.

As was described above, in the electro-magnetically shielded connector of the third embodiment of the present invention, the connector body is made up of at least two housings, and the electrically conductive layer which is thin is formed over the outer surface and the inner surface of one of the two housings in such a manner that, when the two housings are combined with each other, a part of the conductive layer is exposed over the inner surface. When the connector body is sealed with the electrically conductive elastic member, the shield of the shielded cable is pressed against the exposed part of the conductive layer. Hence, the shielded connector is smaller in the number of components, and is reduced in manufacturing cost as well as in weight and in size. Furthermore, the shielded connector is positively water-proofed and dust-proofed; that is, it is prevented from being erroneously operated or from being shortened in service life by the entrance of rust or dust thereinto.

Fourth Embodiment

Figure 15A:
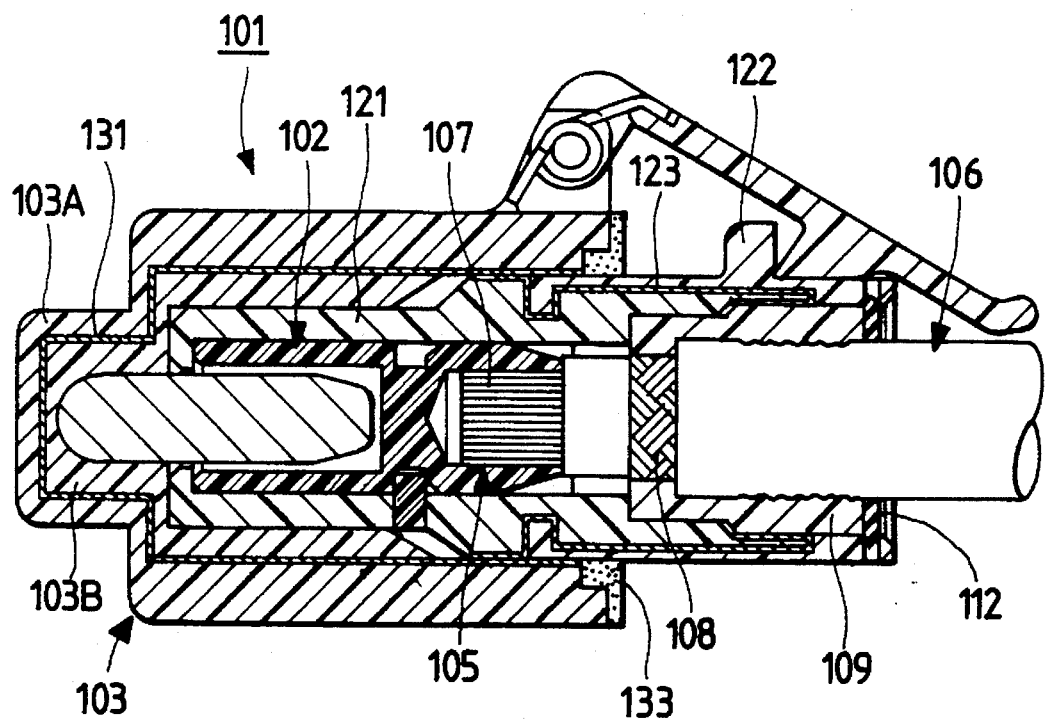
FIG. 15(a) is a longitudinal sectional view showing a female connector and a male connector which are engaged with each other to form the shielded connector of fourth embodiment of the present invention.
Figure 15B:
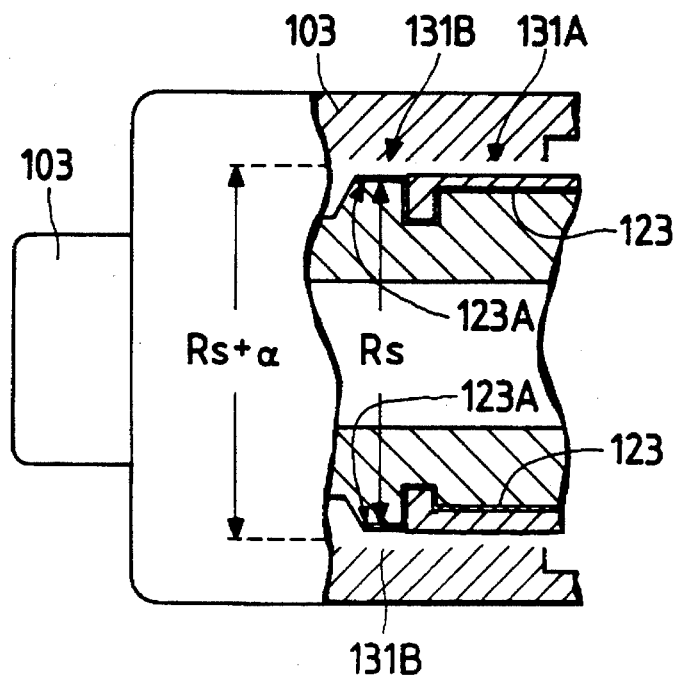
FIG. 15(b) is a sectional view for a description of the dimensions of shielding conductive parts in the shielded connector.

FIGS. 15(a) and (b) shows a shielded connector 101, which constitutes a fourth embodiment of the invention. More specifically, the part (a) of FIG. 15 is a vertical sectional view of the shielded connector with male and female connectors engaged with each other, and the part (b) of FIG. 15 is a sectional view for a description of the dimensions of shielding electrical conductors in the shielded connector.

As shown in those figures, the shielded connector 101 comprises: the female connector 102 employed in the above-described third embodiment; and a male connector 103. The female connector 102 comprises: an inner housing 121 on which an electrically conductive layer 123 is formed by plating; an outer housing 122, and a terminal unit 105 which bears a shielded cable 123 and has an electrically conductive elastic member 109 through which the conductive layer 123 is electrically connected to the braided shield 108 of the shielded cable. On the other hand, the male connector 103 comprises: an outer housing 103A on which an electrically conductive layer 131 is formed by plating; and an inner housing 103B.

The conductive layer 123 of the female connector 102 is a shielding conductive layer, and it includes an exposed portion 123A on the outer surface of the inner housing. The diameter of the exposed portion 123A is Rs. Similarly, the conductive layer 131 of the male connector 103 includes an exposed portion 131A on the inner surface of the outer housing 103A. The diameter of the exposed portion 123A is slightly larger than Rs.

When the female connector 102 is engaged with the male connector 103, the exposed portion 123A is brought into contact with the contact region 131B of the exposed portion 131A; that is, the shielding conductive layers of the male and female connectors are electrically connected with each other.

As a result, the conductive layer 132 is electrically connected to the braided shield 8 of the shielded cable, thus forming an electro-magnetically shielding wall.

In the fourth embodiment of the invention, the exposed portion 123A of the conductive layer 123 of the female connector 102 is brought directly into contact with the exposed portion 131A of the conductive layer 131 of the male connector 103. Hence, the shielded connector suffers from the following difficulties: That is, the control of manufacturing tolerances is rather troublesome, as a result of which the yield is lowered, and the manufacturing cost is increased.

In addition, it is rather difficult to realize the water- proof and dust-proof of the shielded connector.

In order to eliminate the above-described difficulties accompanying the fourth embodiment, a third embodiment of the invention has been developed.

Fifth Embodiment

A fifth embodiment of the invention will be described with reference to FIGS. 12, 13 and 14.

Figure 12:
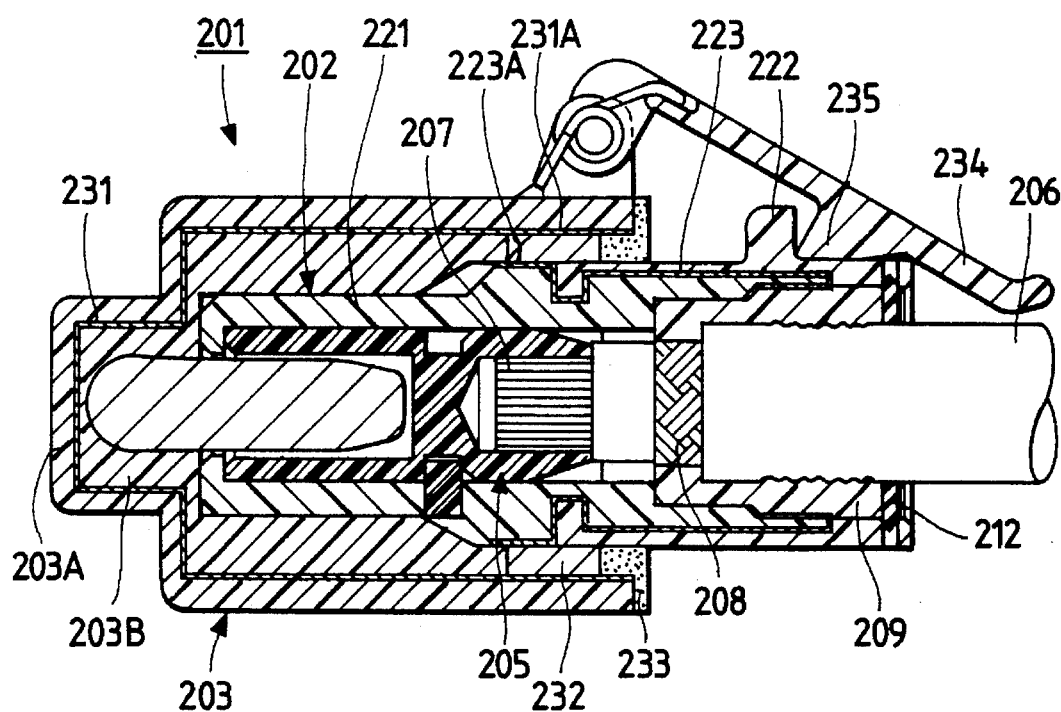
FIG. 12 is a longitudinal sectional view showing an electro-magnetically shielded connector, which constitutes a fourth embodiment of the invention.
Figure 13:
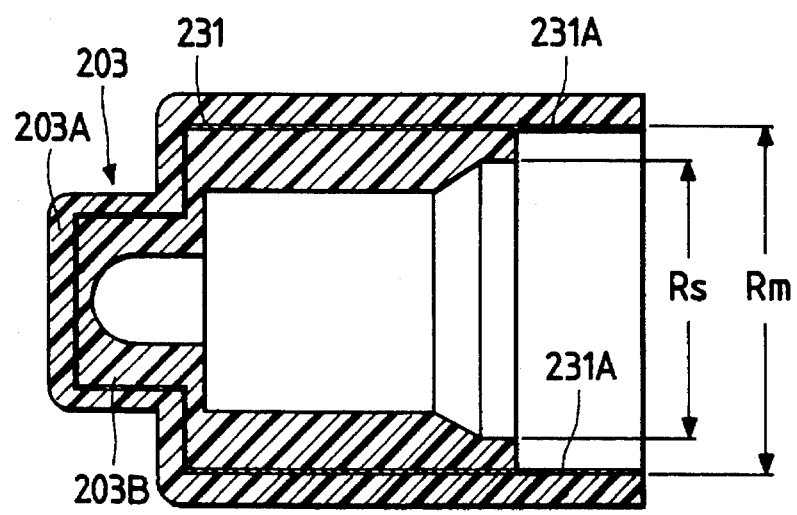
FIG. 13 is a longitudinal sectional view of a male connector forming the shielded connector shown in FIG. 12.

FIG. 12 is a longitudinal sectional view of an electromagnetically shielded connector 201, which constitutes the fifth embodiment of the invention. FIG. 13 is a longitudinal sectional view showing a male connector 203 in the shielded connector. The parts (a) through (c) of FIG. 14 are also longitudinal sectional views showing a female connector 202 in the shielded connector.

The shielded connector 201, the fifth embodiment of the invention, comprises: a female connector 202; and a male connector 203.

First, the structure of the male connector 203 will be described with reference to FIG. 13. The male connector comprises: an outer housing 203A of resin; and an inner housing 203B of resin. An electrically conductive layer 231, which is thin, is formed on the inner surface of the outer housing 203A.

More specifically, the outer housing 203A is made of insulating synthetic resin and is substantially in the form of a cup opened at the rear end.

The conductive layer 231 is formed over the inner surface of the outer housing 203A as was described above, and it is exposed, as indicated at 231A, at the rear end of the outer housing when the latter is engaged with the inner housing (hereinafter referred to as "an exposed portion 231A", when applicable). The diameter of the exposed portion 231A is Rm, which is larger than the diameter Rs of the exposed portion 223A (described later) of the conductive layer 223 of the female connector 202.

The conductive layer 231 is formed by a variety of plating methods such as an electroless plating method, or other methods, impregnating and vacuum-depositing electrically conductive material, and applying electrically conductive paint.

The inner housing 203B is formed by using a resin which is lower in melting point than the resin of the outer housing 203A, in such a manner as to cover substantially the front half of the inner surface of the outer housing 203A on which the conductive layer 231 has been formed.

More specifically, the inner housing 203B thus formed covers the conductive layer 231 except the aforementioned exposed portion 231A at the rear end of the outer housing 203. Thus, the male connector 203 has been fabricated.

Now, the structure of the female connector 202 will be described with reference to FIGS. 14.

Figure 14A:
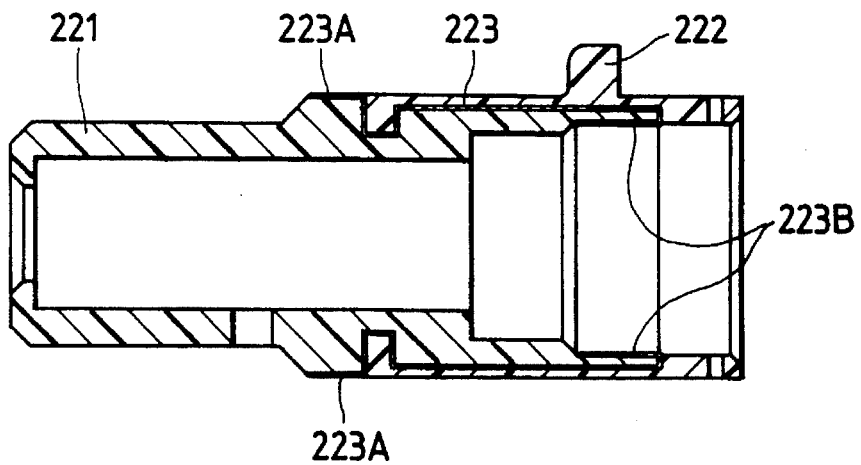
FIG. 14(a) is a longitudinal sectional view of inner and outer housings forming the female connector of a fifth embodiment of the present invention.
Figure 14B:
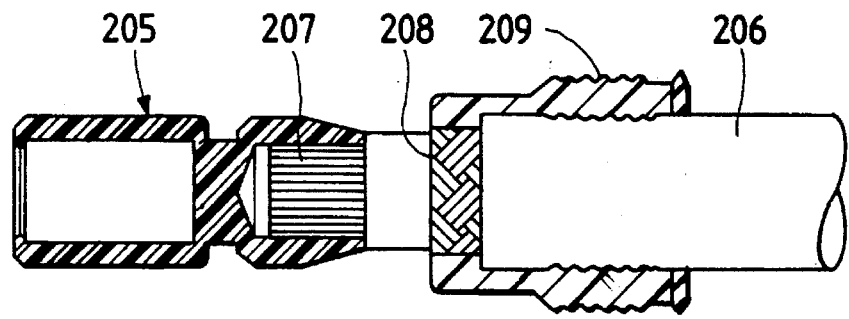
FIG. 14(b) is a longitudinal sectional view of a terminal unit to be engaged with the female connector.
Figure 14C:
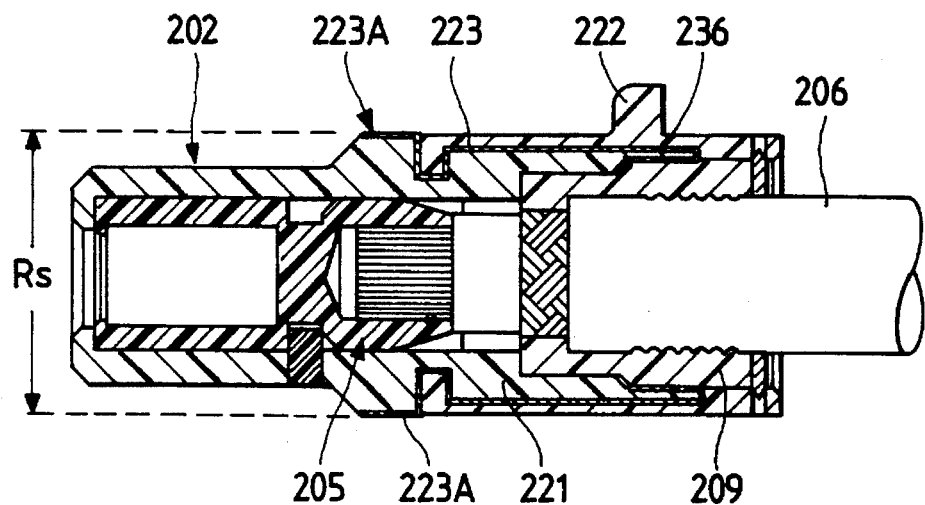
FIG. 14(c) is a longitudinal sectional view showing the female connector engaged with the terminal unit.

The female connector 202 comprises: an inner housing 221 and an outer housing 222 as shown in the part (a) of FIG. 14; and a terminal unit 205 as shown in the part (b) of FIG. 14.

An electrically conductive layer 223 is formed on the outer surface of the inner housing 221, and then the outer housing 222 is formed on the conductive layer 223, thus providing exposed portions 223A and 223B as shown in the part (a) of FIG. 14. The exposed portion 223A has a diameter of Rs.

The terminal unit 205 is adapted to bear the conductor 207 of a shielded cable 206, and has an electrically conductive elastic member 203 which is brought into contact with the braided shield 8 of the shielded cable 206 in such a manner that it covers the latter 206.

The above-described components are assembled into the female connector 202 as shown in the part (c) of FIG. 14.

As the end portion of the terminal unit 205 is engaged with the inner housing 221, the electrically conductive elastic member 209 strongly presses the exposed portion 223B of the conductive layer 223, thus being electrically connected to the latter. As a result, inside the female connector 202, a shielding wall is formed which is extended continuously from the braided shield 208 through the elastic member 209 to the exposed portion 223A of the conductive layer 223.

When the female connector 202 is engaged with the male connector 203, as shown in FIG. 12 the end portion of the female connector 202; i.e., the inner housing 221 of the latter is fitted in the inner housing 203B of the male connector 203. In this case, at the rear end portion of the male connector, a gap is formed between the exposed portion 231A (Rm in diameter) of the conductive layer 231 and the exposed portion 223A (Rs in diameter) of the conductive layer 223.

An electrically conductive elastic member 32 is inserted into the gap thus formed in such a manner that it is held sufficiently compressed therein. As a result, the exposed portion 231A is electrically connected through the electrically conductive elastic member 32 to the exposed portion 223A; that is, the conductive layer 231 is electrically connected to the conductive layer 223.

Thus, a shielding wall has been formed which is extended from the braided shield 208 of the shielded cable 206 through the electrically conductive elastic member 209, the conductive layer 223 and the electrically conductive elastic member 232 to the conductive layer 231.

The electrically conductive elastic member 32, which is held sufficiently compressed in the aforementioned gap, isolates the inside of the male connector 203 from the outside, thus preventing the entrance of water or dust into the shielded connector.

That is, by inserting the electrically conductive elastic member 32 into the gap in such a manner that it is held compressed therein, not only the shielding wall of the shielded connector is formed, but also the shielded connector is prevented from the entrance of water or dust.

The shielded connector can be further improved in waterproof and in dust-proof by sealing the rear end of the male connector 203 with an outer plug 233 such as a rubber bushing. After the male and female connectors have been combined as described above, a turning arm 234 provided on the male connector 203 is turned until its pawl 235 is engaged with a protrusion formed on the female connector 202.

As was described above, in the electro-magnetically shielded connector, the fifth embodiment of the invention, the diameter of the exposed portion of the electrically conductive layer of the male connector is larger than that of the exposed portion of the electrically conductive layer of the female connector. Hence, in manufacturing the components, the tolerances on them may not be so severe, as a result of which the yield is increased as much, and accordingly the manufacturing cost is decreased.

After the male and female connectors are engaged with each other, the gap formed between the exposed portions of the electrically conductive layers of the male and female connectors is filled with the electrically conductive elastic member, so that the exposed portions are electrically connected to each other through the electrically conductive elastic member; that is, the conductive layers of the male and female connectors are electrically connected to the braided shield of the shielded cable, thus forming the shielding wall. The electrically conductive elastic member can be adjust in volume. Hence, even if the gap is variable in dimension, it can be sufficiently filled with the electrically conductive elastic member. Furthermore, the electrically conductive elastic member held compressed in the gap prevents the entrance of water or dust into the shielded connector. That is, the shielded connector is free from the difficulties that because of the formation of rust or the presence of dust, the shielded connector is operated erroneously or it is shortened in service life.

What is claimed is:

1. An electromagnetically shielded connector comprising:

a housing made of an electrically insulating material, said housing being substantially cylindrical and defining a chamber therein;

a shield member made of an electrically conductive material, said shield member being disposed inside of said housing and being integrally formed with said housing;

an electrical terminal unit received in said chamber and adapted to be connected to a shielded electrical cable;

a water-proof plug made of an electrically conductive material and coupled to an end of said shielded electrical cable and being adapted to receive a portion of the shielded electrical cable, said water-proof plug being disposed in an opening of said chamber to seal said opening, said water-proof plug being coupled to a shield of the shielded electrical cable and to said shield member.

* * * * *